US009021398B2

(12) United States Patent
Kotler et al.

(10) Patent No.: US 9,021,398 B2
(45) Date of Patent: Apr. 28, 2015

(54) PROVIDING ACCESSIBILITY FEATURES ON CONTEXT BASED RADIAL MENUS

(75) Inventors: Matthew Kotler, Sammamish, WA (US); Erez Kikin Gil, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/349,691

(22) Filed: Jan. 13, 2012

(65) Prior Publication Data

US 2013/0019206 A1  Jan. 17, 2013

Related U.S. Application Data

(60) Provisional application No. 61/556,945, filed on Nov. 8, 2011, provisional application No. 61/507,983, filed on Jul. 14, 2011.

(51) Int. Cl.
*G06F 3/048* (2013.01)
*G06F 3/0488* (2013.01)
*G06F 3/0489* (2013.01)
*G06F 3/0482* (2013.01)

(52) U.S. Cl.
CPC .......... *G06F 3/0488* (2013.01); *G06F 3/04895* (2013.01); *G06F 3/0482* (2013.01); *G06F 3/04886* (2013.01)

(58) Field of Classification Search
USPC ........... 715/834, 747, 711, 712, 708; 345/589
See application file for complete search history.

(56) References Cited

U.S. PATENT DOCUMENTS

| | | |
|---|---|---|
| 6,281,879 B1 | 8/2001 | Graham |
| 6,542,164 B2 | 4/2003 | Graham |
| 6,828,988 B2 | 12/2004 | Hudson et al. |
| 7,256,770 B2 | 8/2007 | Hinckley et al. |
| D563,972 S | 3/2008 | Sherry |
| 7,533,340 B2 | 5/2009 | Hudson et al. |
| 7,570,943 B2 | 8/2009 | Sorvari et al. |
| 7,710,409 B2 | 5/2010 | Robbin et al. |
| 7,712,049 B2 | 5/2010 | Williams et al. |
| 7,895,531 B2 | 2/2011 | Radtke et al. |
| 8,239,882 B2 | 8/2012 | Dhanjal et al. |
| 8,245,156 B2 | 8/2012 | Mouilleseaux et al. |

(Continued)

OTHER PUBLICATIONS

Koenig, Joerg, "Radial Context Menu", Retrieved at <<http://www.codeproject.com/KB/system/RadialContextMenu.aspx>>, Jul. 21, 2005, pp. 4.

(Continued)

*Primary Examiner* — Nicholas Ulrich
*Assistant Examiner* — Joy M Weber
(74) *Attorney, Agent, or Firm* — Steve Crocker; Jim Ross; Micky Minhas

(57) ABSTRACT

Radial context based menus are employed for content management through touch or gesture actions, keyboard entries, mouse or pen actions, and similar input. Different actions and combinations of actions enable users to activate submenus, execute commands, or collapse context based menus. Accessibility features are integrated with radial context based menus to ease user interaction with radial context based menu controls. Distinct accessibility controls are superimposed on radial context based menu controls to aid with command interactions. Additionally, contrast schemes are implemented on radial context based menu controls and surrounding regions to differentiate the context base menu controls for visual acuity.

20 Claims, 10 Drawing Sheets

(56) References Cited

U.S. PATENT DOCUMENTS

| | | | |
|---|---|---|---|
| 2002/0156870 A1* | 10/2002 | Boroumand et al. | 709/219 |
| 2005/0183040 A1* | 8/2005 | Kondo et al. | 715/841 |
| 2005/0216834 A1 | 9/2005 | Gu | |
| 2007/0055936 A1 | 3/2007 | Dhanjal et al. | |
| 2007/0168890 A1 | 7/2007 | Zhao et al. | |
| 2007/0180392 A1 | 8/2007 | Russo | |
| 2007/0256029 A1† | 11/2007 | Maxwell | |
| 2007/0271528 A1† | 11/2007 | Park et al. | |
| 2009/0037813 A1 | 2/2009 | Newman et al. | |
| 2009/0083665 A1† | 3/2009 | Anttila et al. | |
| 2009/0187860 A1* | 7/2009 | Fleck et al. | 715/834 |
| 2009/0327964 A1 | 12/2009 | Mouilleseaux et al. | |
| 2010/0192102 A1 | 7/2010 | Chmielewski et al. | |
| 2010/0299637 A1 | 11/2010 | Chmielewski et al. | |
| 2010/0306702 A1 | 12/2010 | Warner | |
| 2011/0066981 A1 | 3/2011 | Chmielewski et al. | |
| 2011/0093815 A1 | 4/2011 | Gobeil | |
| 2011/0209093 A1 | 8/2011 | Hinckley et al. | |
| 2011/0248928 A1† | 10/2011 | Michaelraj | |
| 2012/0036434 A1† | 2/2012 | Oberstein | |
| 2012/0042006 A1 | 2/2012 | Kiley et al. | |
| 2012/0218282 A1* | 8/2012 | Choboter et al. | 345/589 |
| 2012/0221976 A1 | 8/2012 | Johns | |
| 2013/0047123 A1* | 2/2013 | May et al. | 715/834 |

OTHER PUBLICATIONS

Francone, et al., "Wavelet Menus on Handheld Devices: Stacking Metaphor for Novice Mode and Eyes-Free Selection for Expert Mode", Retrieved at <<http://iihm.imag.fr/publs/2010/AVI10-Francone-Bailly-Lecolinet-Nigay.pdf>>, 2010, pp. 8.

"Radial Menu", Retrieved at <<http://www.eliteinfotech.info/the-temple-of-elemental-evil/radial-menu.html>>, Apr. 1, 2011, pp. 4.

"jQuery Radmenu Plugin", Retrieved at <<http://www.tikku.com/jquery-radmenu-plugin>>, May 14, 2010, pp. 18.

"Compact Control Menu for Touch-Enabled Command Execution", U.S. Appl. No. 13/090,438, filed Apr. 20, 2010, pp. 27.

"Context Menus and Sub-Menus", Retrieved at <<http://ignorethecode.net/blog/2009/03/21/context-menus-sub-menus/>>, Mar. 21, 2009, pp. 9.

Nguyen, Chuong, "Apple Patent Reveals GUI with Radial Pop-Up Menus in iOS", Retrieved at <<http://www.ubergizmo.com/2010/12/apple-patent-reveals-gui-with-radial-pop-up-menus-in-ios/>>, Feb. 12, 2010, pp. 3.

"Pie menu", Retrieved at <<http://web.archive.org/web/20110331143948/http://en.wikipedia.org/wiki/Pie_menu>>, Mar. 31, 2011, pp. 5.

Hopkins, Don, "Pie Menus on Python/GTK/Cairo for OLPC Sugar", Retrieved at <<http://web.archive.org/web/20110515030103/http://www.donhopkins.com/drupal/node/128>>, May 15, 2011, pp. 10.

"Pie In The Sky", Retrieved at <<http://web.archive.org/web/20100702160443/http://jonoscript.wordpress.com/2008/10/28/pie-in-the-sky/>>, Jul. 2, 2010, pp. 33.

Fitzmaurice, et al., "PieCursor: Merging Pointing and Command Selection for Rapid In-place Tool Switching", Retrieved at <<http://www.autodeskresearch.com/pdf/p1361-fitzmaurice.pdf>>, In Proceedings of the SIGCHI Conference on Human Factors in Computing Systems, Apr. 5, 2008, pp. 10.

"Autodesk Inventor Fusion: Getting Started", Retrieved at <<http://images.autodesk.com/emea_s_main/files/Getting_Started.pdf>>, Retrieved Date: Dec. 28, 2012, pp. 9-18.

"Wacom Tablets. The basics.", Retrieved at <<http://images.autodesk.com/emea_s_main/files/Getting_Started.pdf>>, Feb. 25, 2011, pp. 11.

"ATOK for Android", Retrieved at <<http://www.youtube.com/watch?v=bZiDbz0aJKk>>, Jun. 9, 2012, pp. 2.

"Google Reveals Possible Radial Styled Menus Coming to Android", Retrieved at <<http://www.patentbolt.com/2012/07/google-reveals-possible-radial-styled-menus-coming-to-android.html>>, Jul. 31, 2012, pp. 9.

"Apple Granted a Major Radial Menus Patent for iOS and OS X", Retrieved at <<http://www.patentlyapple.com/patently-apple/2012/08/apple-granted-a-major-radial-menus-patent-for-ios-and-os-x.html>>, Aug. 14, 2012, pp. 12.

Office Action received for Application No. 13/284,279, mailed Jul. 8, 2014 and filed on Oct. 28, 2011.

Office Action received for Application No. 13/341,074, mailed Jun. 11, 2014 and filed on Dec. 30, 2011.

* cited by examiner
† cited by third party

PROVIDING ACCESSIBILITY FEATURES ON CONTEXT BASED RADIAL MENUS

CROSS REFERENCE TO RELATED APPLICATIONS

This application claims the benefit of U.S. Provisional Patent Application Ser. No. 61/556,945 filed on Nov. 8, 2011 and U.S. Provisional Patent Application Ser. No. 61/507,983 filed on Jul. 14, 2011. The disclosures of the provisional patent application are hereby incorporated by reference for all purposes.

BACKGROUND

With the proliferation of computing and networking technologies, two aspects of computing devices have become prevalent: non-traditional (e.g., mouse and keyboard) input mechanisms and smaller form factors. User interfaces for all kinds of software applications have been designed taking typical screen sizes and input mechanisms into account. Thus, user interactions in conventional systems are presumed to be through keyboard and mouse type input devices and a minimum screen size that enables users to interact with the user interface at a particular precision.

Limited display real estate burdens many portable devices from providing full featured content management functionality. Furthermore, gestural commanding is not efficient using conventional menus including support for limited displays or just taking into account where the user's finger/mouse/pen is. Additionally, display devices such as projectors, monitors, and televisions may lack controls for providing content management functionality. Modern software solutions such as on screen keyboards may be awkward to type and encompass valuable display area. Lack of adequate software solutions for managing content on non-traditional devices largely limit device use to content consumption. Additionally, support for accessibility options on non-traditional devices is inconsistent at best and non-existent at worst. Carrying multiple devices for content management and consumption defeats portability and unnecessarily takes away from an enriching singular source for content consumption and management.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing accessibility features on radial context based menus employed in content management through touch or gesture actions, keyboard entries, mouse or pen actions, voice input, visual input and similar input. Radial context based menus may be deployed using a variety of shapes, forms, and content. Different actions and combinations of actions may enable users to interact with radial context based menu controls. Control interactions may include activating submenus, executing commands, or collapsing radial context based menus. According to a device setting or a user action, a user interface may superimpose accessibility controls on associated radial context based menu controls. An example user interface may detect a user action activating an accessibility control and activate an associated radial context based menu control. Additionally, the user interface may adjust contrast of a control compared to other regions of the radial context based menu according to an accessibility configuration.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1A:
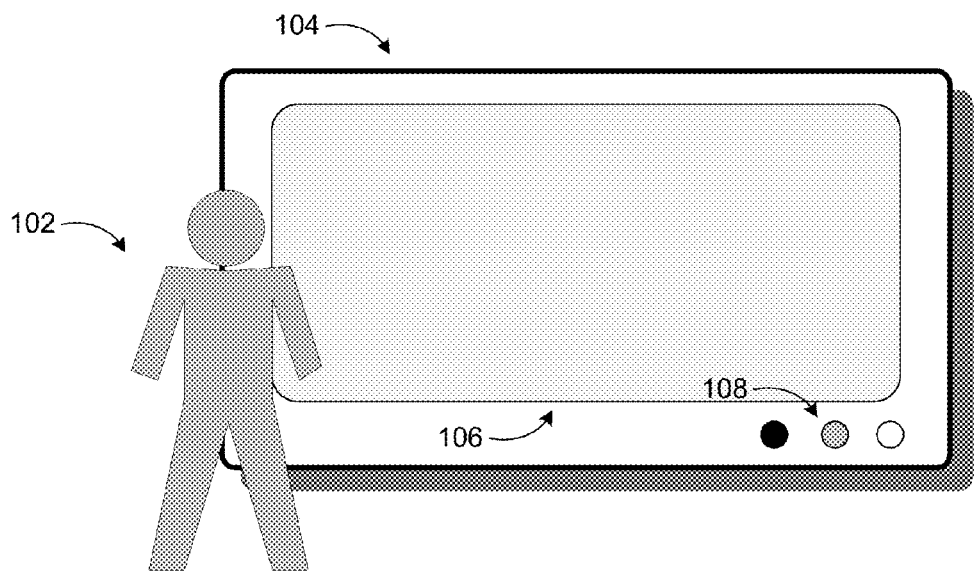
FIGS. 1A and 1B illustrate some example devices, where radial context based menus may be employed.
Figure 1A:
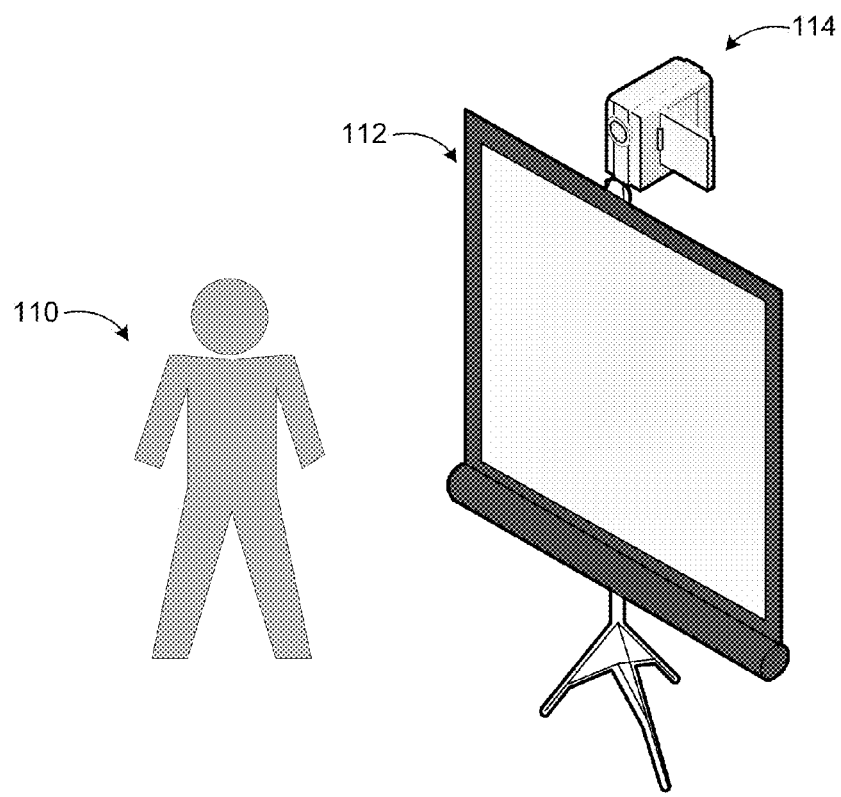

As briefly described above, a user interface may present a context based menu in relation to displayed content. The context based menu may provide controls such as commands, links or submenus to manage the displayed content. The device may detect a user action associated with the system, and the user interface may superimpose accessibility controls on associated context based menu controls. Accessibility controls may include numbers mapped to associated context based menu controls to enhance and simplify keyboard input and voice input. In addition, the user interface may implement a contrast scheme to adjust color contrast between a context menu control and surrounding region to enhance visual identification. The contrast variation may be dynamically implemented according to ambient light levels.

Typically some accessibility settings such as contrast settings are across an entire operating system. Thus, a user may choose to make their entire system in high contrast and the applications may respond. Similarly, large fonts (also referred to as "high pixel density") may be applied across an operating system as opposed to on an application basis. In addition to high contrast, embodiments may include context based menus that provide large fonts and/or high pixel density (also known as DPI or PPI) by showing larger images for the radial context based menu as a whole, as well as all icons within it and the text within may grow as well. In other embodiments, the font scheme may be modified to change the font size in order to assist users with low vision or on devices that have a high pixel density, thereby making fonts appear smaller.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in the limiting sense, and the scope of the present invention is defined by the appended claims and their equivalents. While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable media.

According to embodiments, a user interface may provide accessibility features in a radial context based menu. A context based menu may make use of features specific to touch or gesture enabled computing devices, but may also work with a traditional mouse, keyboard, voice, and visual input. Context based menus are used to provide quick access to commonly used controls for access to commands while viewing or editing displayed content such as documents, emails, contact lists, other communications, or any content (e.g., audio, video, etc.). Context based menus may appear as part of a user interface's regular menu, in a separate viewing pane (e.g., a window) outside or inside the user interface, and so on. Typically, context based menus present a limited set of controls for easy user access to commands, but additional controls may be presented upon user selection for submenus and links. Commonly used context based menus may appear over the viewed document. A user action as used herein may be provided by a user through a finger, a pen, a mouse, or similar device, as well as through predefined keyboard entry combinations or a visual and voice input.

Figure 1B:
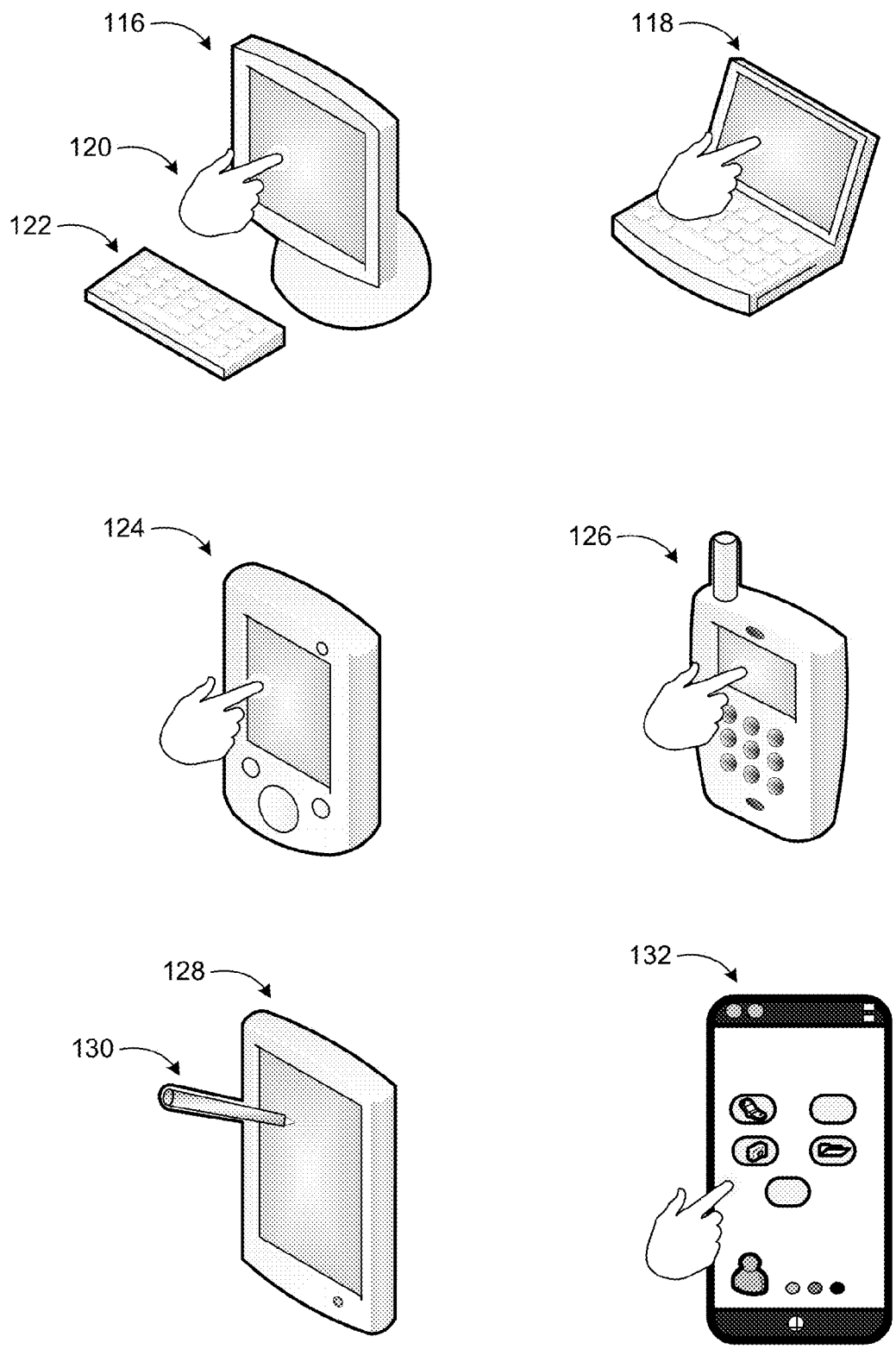

FIGS. 1A and 1B illustrate some example devices, where radial context based menus may be employed. As touch and gesture based technologies are proliferating and computing devices employing those technologies are becoming common, user interface arrangement becomes a challenge. Touch and/or gesture enabled devices, specifically portable devices, tend to have smaller screen size, which means less available space for user interfaces. For example, in a user interface that enables editing of a document (text and/or graphics), in addition to the presented portion of the document, a virtual keyboard may have to be displayed further limiting the available space ("real estate"). Thus, in such scenarios, providing a full control menu may be impractical or impossible. Embodiments are directed to providing accessibility features on a context based menu.

As mentioned above, smaller available display space, larger content, and different aspect ratios make conventional menus impractical. Existing touch-based devices such as tablet PCs and similar ones are typically directed to data consumption (i.e., viewing). On the other hand, commonly used applications such as word processing applications, spreadsheet applications, presentation applications, and comparable ones are directed to creation (generating and editing documents with textual, graphical, and other content). Currently available context based menus are either invisible most of the time or they block the content when they are visible. A context based menu according to some embodiments may be provided dynamically based on presented content and available space while providing ease of use without usurping much needed display area.

Referring to FIGS. 1A and 1B, some example devices are illustrated, where accessibility features may be provided on a radial context based menu according to embodiments. Embodiments may be implemented in touch and/or gesture enabled devices or others with keyboard/mouse/pen/voice/visual input, with varying form factors and capabilities.

Device 104 in FIG. 1A is an example of a large size display device, where a user interface may be provided on screen 106. Functionality of various applications may be controlled through hardware controls 108 and/or soft controls such as a context based menu displayed on screen 106. A user 102 may be enabled to interact with the user interface through touch actions or gestures (detected by a video capture device). A context based menu control such as a launcher indicator may be presented at a fixed location or at a dynamically adjustable location for the user 102 to activate the context based menu. Examples of device 104 may include public information display units, large size computer monitors, and so on. While example embodiments are discussed in conjunction with small size displays, where available display area is valuable and location, size, content, etc. of a context based menu may be determined based on available display area; the opposite consideration may be taken into account in larger displays. For example, in a large size display such as a public information display unit or a large size computer monitor, a context based menu may be dynamically positioned near selected content such that the user 102 does not have to reach over to the menu or have to move it in order to work comfortably.

Device 112 in FIG. 1A is an example for use of a context based menu to control functionality. A user interface may be displayed on a screen or projected on a surface and actions of user 110 may be detected as gestures through video capture device 114. The user's gestures may be determined by an analysis of a user action to activate a context based menu to manage displayed content displayed on the device 112.

FIG. 1B includes several example devices such as touch enabled computer monitor 116, laptop computer 118, hand-held computer 124, smart phone 126, tablet computer (or slate) 128, and mobile computing device 132, which may be used for computing, communication, control, measurement, and a number of other purposes. The example devices in FIG. 1B are shown with touch activation 120. However, any of these and other example devices may also employ gesture enabled activation of context based menus to manage displayed content. In addition, tools such as pen 130 may be used to provide touch input. A context based menu may be controlled also through conventional methods such as a mouse input, input through a keyboard 122, a voice input, or a visual input.

Figure 2:
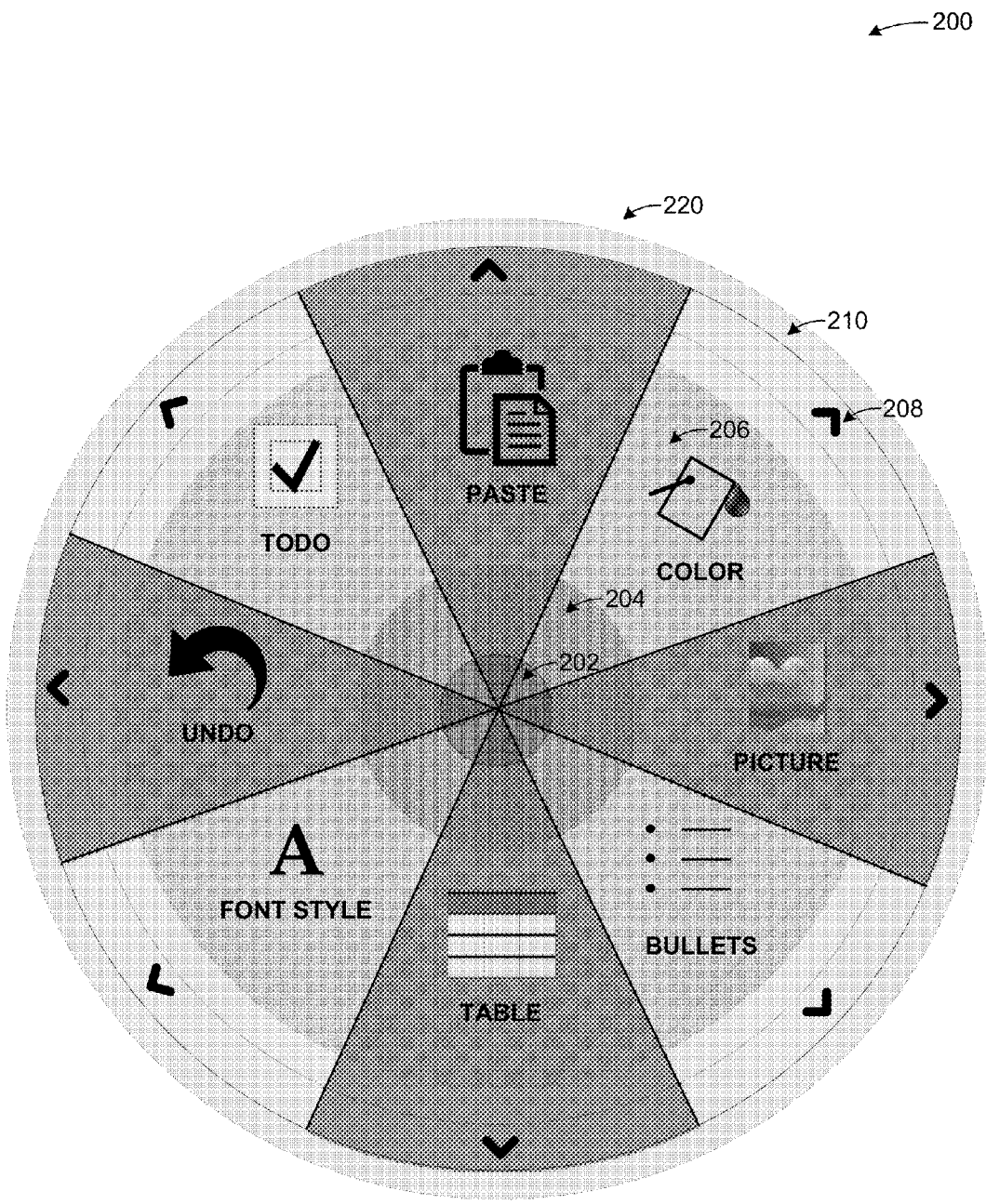
FIG. 2 illustrates an example radial context based menu according to embodiments.

FIG. 2 illustrates an example radial context based menu according to embodiments. Diagram 200 displays an example context based menu. The context based menu 220 is shown with a radial shape, but embodiments may be implemented using other forms or shapes. The context based menu may provide functionality through controls such as commands, links, and submenus suitable for managing displayed content. In an example scenario, the context based menu 220 may display controls such as commands to edit a textual content including, but not limited to, change font style, insert/remove/edit a table, and insert/edit bullets. In some cases, the menu may provide a command that can be executed directly through the displayed element (e.g., icon). In other cases, the displayed element may activate a submenu that includes more detailed commands associated with a particular aspect of content. For example, a submenu may be activated through a table icon (and/or text) on a parent menu and display commands associated with different aspects of creating and editing tables (e.g., adding/removing rows/columns, editing cell characteristics, etc.).

Additionally, the context based menu 220 may display generic user interface commands such as paste and undo. The context based menu 220 may also provide commands to manage hybrid displayed content such as documents containing text and images. Examples may include commands to insert a picture to the document or alter a color scheme of the picture through a fill color command. The context based menu 220 may also be customizable to display useful links to launch or bring forward background applications such as a TODO list. Customization may depend on viewed content and usage patterns such as number of times a user accesses an application while managing a displayed content type. In addition to usage based customization, end user customization—the ability for a user to be able to change the set of controls that are available on context based menu—may also be enabled in a system according to embodiments. Furthermore, developer customization—the ability for a developer to add or change (for all their users) the controls that are available—may further be enabled according to some embodiments.

The context based menu 220 may have a center control button such as a launcher indicator 202. In addition to activating the context based menu 220, the launcher indicator may also collapse the context based menu 220. In some embodiments, the center button may be used for executing commands (by gesturing through the launcher), as a quick way to bring up labels, and/or as a way to move around the context based menu on the canvas. Alternatively, a user may activate the launcher indicator 202 or provide a gesture imitating the activation action to collapse the context based menu 220. The collapse action may minimize the context based menu 220 or hide it from view within the user interface. Additionally, area 204 may be an unreactive region to minimize incorrect user action detection between a collapse/activation action and other user actions provided by the context based menu 220.

Region 206 may include a control such as a command or a link to accomplish functionality provided by the context based menu 220. The control may be executed upon detecting a user action in region 206. Alternatively, a control such as a link may be launched according to detected user action in region 206.

According to an embodiment, submenu launcher indicator 208 may enable a user to activate a submenu associated with a command or link embedded in region 206. The submenu may be tailored to provide additional features related to link or command in region 206. An example submenu may be a color palette associated to fill in color command in region 206 of the context based menu 220.

According to other embodiments, outer region 210 may correspond to a cancel action. Upon detecting a user action extending to the region 210, the user interface may cancel previously detected user action to execute a command or launch a link. An example may be a user finger (or pen) swipe over region 206 ending in region 210. One of the aspects of a radially designed context based menu is that directionality and not distance dictate what control is executed. As a result, a cancel region may be used over two times the radius of the radial menu out from the center. This means that a user can swipe relatively far out without getting into the cancel region (for illustration purposes, in the drawing, the impression is given that the cancel region is immediately outside the menu).

Of course, other icons, symbols, textual content, etc. may be used to represent specific context based menus and submenus. According to some embodiments, a context based menu may be activated without a launcher indicator being displayed. For example, the menu may be presented directly in response to selection of a portion of the displayed content. Additionally, the context based menu may also be presented in response to detection of a keyboard input.

Figure 3:
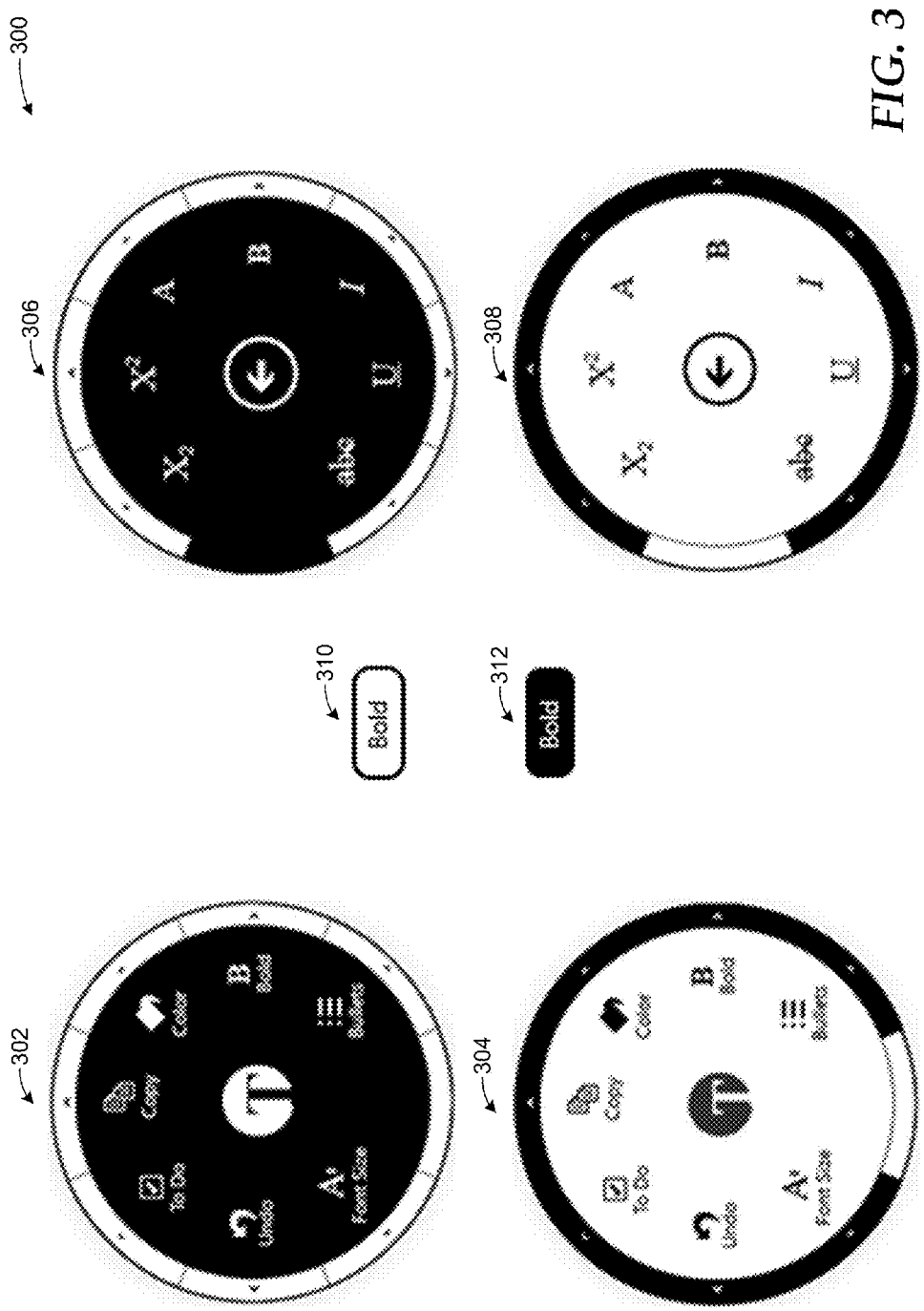
FIG. 3 illustrates example contrast based scenarios for providing accessibility features on radial context based menus according to embodiments.

FIG. 3 illustrates example contrast based scenarios for providing accessibility features on radial context based menus according to embodiments. Diagram 300 displays example context based menu with contrasted colors on controls and surrounding regions.

As previously stated, context based menus may be provided with accessibility features. High contrast features in displayed controls are particularly important for the visually impaired to aid in content management. According to an embodiment, a context based menu 302 may display primary controls such as commands in a contrasting color compared to the surrounding regions. A surrounding region may be a background region of the context based menu. A user interface may display the surrounding region in a dark color and the primary controls in a light color. The choice of color and contrast scheme may be mainly due to a change in a system setting. The schemes may also be selected according to a device setting, external input, or a user input. An example may be an ambient light level sensor sensing a low ambient light level. The low ambient light level may instigate dark colored surrounding regions and light colored primary controls within the context based menu 302.

Alternatively, the user interface may reverse the contrast scheme and display the surrounding region in a light color and the controls in a dark color within an example context based menu 304. The contrast scheme reversal may be according to a detected high ambient light level. Upon detecting the high ambient light level, the user interface may adjust the surrounding region to a light color and the controls to a dark color to generate contrast within the context based menu 304.

According to other embodiments, the context based menu 306 may display secondary controls such as sub-menu commands according to another contrast scheme. Similar to low ambient light level based example for the primary controls, the secondary controls of the context based menu may be displayed in a light color while the surrounding region is displayed in a dark color. In an example context based menu 308, the contrast scheme may be reversed. The controls may be displayed in a dark color and the surrounding region may be displayed in a light color. The contrast scheme selection may be according to ambient light level detection as discussed above.

According to yet other embodiments, labels (310, 312) of controls may be also be displayed in a contrasting color compared to the control. The label may be displayed in a color and brightness that varies substantially from the control and the surrounding region. The color and brightness selection for the controls, surrounding regions, and labels may be according to a gradient (i.e., selection across a spectrum of options as opposed to a binary selection). The selection may be determined dynamically, according to a device setting range, or manually by a user.

According to other embodiments, the user interface may display a control in a contrasting color compared to a surrounding region upon detecting an accessibility configuration. The accessibility configuration may be determined according to a user action manually adjusting the contrast scheme or a device setting automatically adjusting the contrast scheme. The ambient light level may be determined according to a date/time value and a light sensor input. The date/time value may be used to determine outdoors light levels. The light sensor may be a dedicated photo-detector or photo-sensor, but also an integrated camera or other similar device.

According to other embodiments, in response to detecting a predetermined or user customizable keyboard input, the user interface may navigate through the context based menu controls. An example may be a key combination matching a navigation forward and backward command to select one of the context based menu controls. In some embodiments, keyboarding may be enabled on sliders like the font size control. In these cases, if the user is keyboarding, they may be enabled to enter the font size they want (e.g., 3 and 6 for 36 pt font). In another scenario, the user interface may display key tips associated with the context based menu controls. The key tips may have rectangular shapes.

Figure 4A:
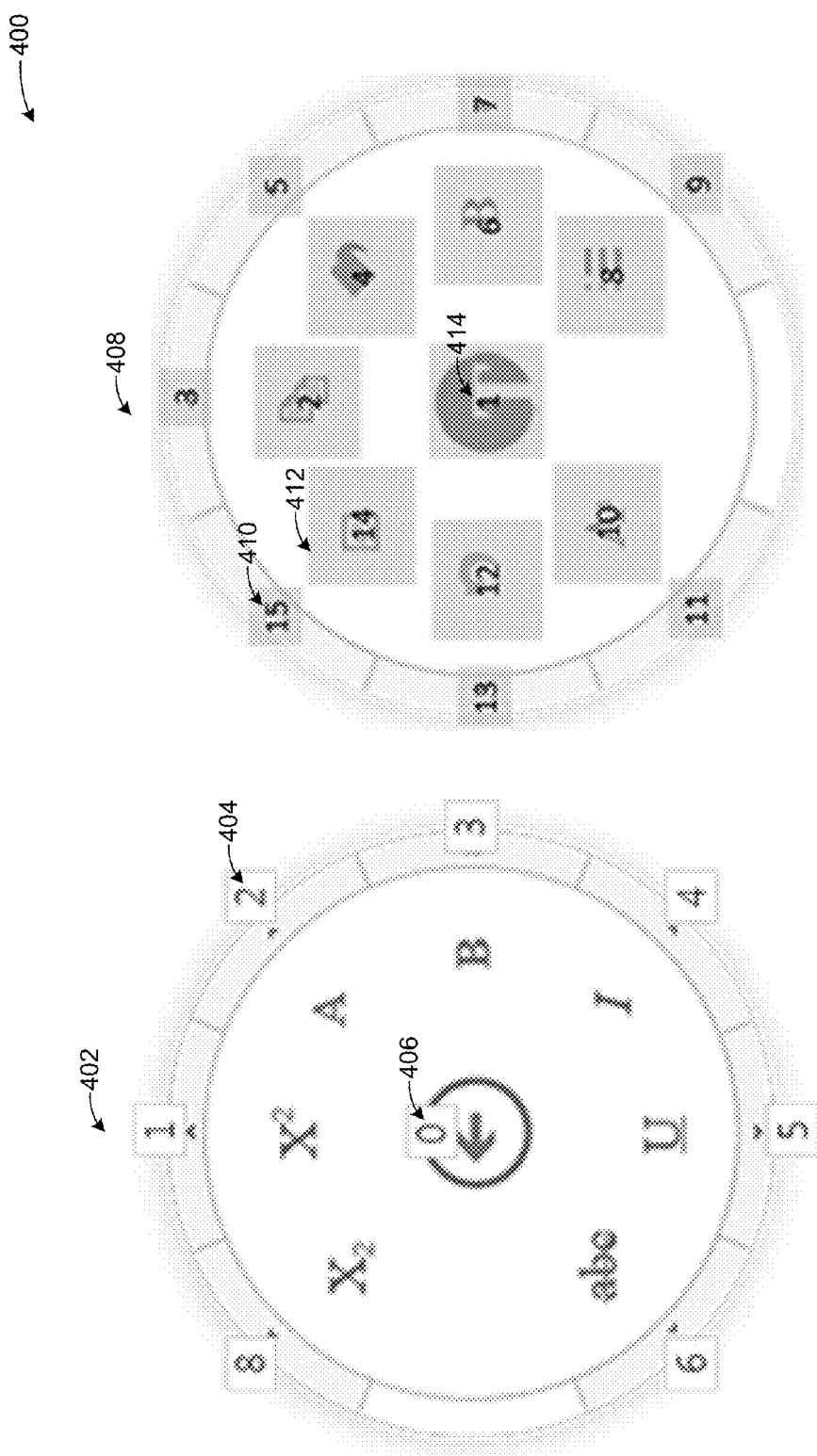
FIG. 4A illustrates example accessibility control based scenarios for providing accessibility features on radial context based menus according to embodiments.

FIG. 4A illustrates example accessibility control based scenarios for providing accessibility features on radial context based menus according to embodiments. Diagram 400 displays example context based menus with superimposed accessibility controls.

An example context based menu 402 may be displayed with superimposed accessibility controls. A user interface may superimpose accessibility controls on context based menu 402 corresponding to a keyboard. A keyboard may provide tactile feedback to a user and enable a disabled user with finer motor control over user actions on the context based menu 402. In addition, for some users just memorizing the keyboard combinations may be more efficient (regardless of whether they have disabilities or not). Upon detecting a user action activating the accessibility control 404, the user interface may activate the associated sub-menu launcher. For example, pressing the Alt key on the keyboard may display the key tips. Alternatively, a separate application like a speech recognition application may be launched, where the user can say "Show Numbers" and get the numbers displayed in FIG. 4 for instance. In another example, the user interface may activate a navigation command to return to primary context based menu upon detecting user activation of accessibility control 406.

Another example context based menu 408 may display command controls and sub-menu launcher controls superimposed with accessibility controls. An example sub-menu launcher control may be superimposed with an accessibility control 410 associated with a number. The number may be input to the user interface through a speech to text recognition system activating the accessibility control 410. Additionally, accessibility controls 412 and 414 may be superimposed on their associated command controls. Accessibility controls may be employed in a particular shape such as a square shape to emphasize location and functionality.

According to an embodiment, numbers may be assigned to the accessibility controls. The numbers may be incrementally assigned in a clockwise rotation on the context based menu for adjacent accessibility controls. Alternatively, the numbers may be incrementally assigned counterclockwise on the context based menu for adjacent accessibility controls. The number may be a single digit corresponding to a keyboard number key. Additionally, types of controls such as commands, sub-menu launchers, and links may be differentiated by assigning an odd or an even number to a type of control.

According to other embodiments, rectangular shapes may be mapped on top of the oval shaped context based menu (as shown in FIG. 4). Additionally, the rectangular shaped accessibility control may be exposed to a text to speech accessibility system for identification of one or more oval shaped context based menu controls to a user. The voice identification of the oval shaped context based menu control may allow the user to interact with the control without requiring their hands.

In some examples, the radial menu may be expanded using the context menu button on the keyboard (in addition to the accelerators described below). Pressing escape may collapse the radial menu but may keep the radial menu indicator visible, if the indicator was visible when the radial menu was opened (e.g., depending on the application or whether the application is in snapped view). Furthermore, pressing a keyboard combination like ALT+0 may also expand the radial menu. There may be multiple ways to interact with the commands like users employing tab or SHIFT+tab to manually move through the commands, key tips being assigned to each command on the radial menu, and through shortcut keys.

The center of the radial menu may receive keyboard focus when the radial menu is expanded with the keyboard. Tab may navigate clockwise starting with the top item through the radial menu buttons alternating between the command and its "split button" or launcher. After navigating to the last top level command (or its launcher if one exists), the final tab may navigate to the parent or hand. SHIFT+tab may navigate in reverse. The space or enter key may execute any command or launch a sub-menu if focus is on the launchers. When a sub-menu is launched focus may be at the same position (e.g., hitting enter with the bold top level command focus may leave focus on the bold command within the sub-menu).

The user may also be able to move through the radial menu with arrow keys. Using up and down arrows may navigate counterclockwise and clockwise (respectively). With an item selected that has a sub-menu then the right arrow may navigate to the sub-menu and the left arrow may move back to the parent (if there is one). Each command may define an access key. The access keys may be displayed using key tips similar to conventional user interface controls whenever the user presses the ALT key or F10. Additionally, if the key tips are displayed interior labels may also be displayed. In some examples, accelerator keys (e.g., CTRL+key) associated with the commands may be employed.

Key tips may be displayed in a square box that overlaps the sub-menu launcher region as shown in the figure. The background of the key tips may be the same as the background of the radial menu and there may be a 1px gray border around the key tip in some implementations. The font may match the font (face and size) of the exterior labels. The key tips may not have any animation when shown if the goal to make them feel instantaneous to the user. However, they may have the same animate out animation as the exterior label.

Each of the access keys, with the exception of the radial menu center, may be a letter. Key tips may need to be a localizable resource (so that the key tip can change from locale to locale). And, with the use of letters for key tips, there is a potential for conflicts. For example, the same command may exist in multiple contexts and in one place there may not be a conflict but in another there may be a conflict (e.g., in a menu, the "B" for "bold" may not have conflicts but at the top level menu the key tip for "bold" and "bullets" might conflict) . Such conflicts may be resolved by appending a unique number to the key tip starting from 1 and going in clockwise order around the menu. To prevent additional conflicts with any of the letters, zero (0) may be set equivalent to pressing on the center button. A slashed zero may be used to distinguish it more clearly from a capital O. Similarly, the user may also open the radial menu or navigate back from a sub-menu by pressing ALT+0.

Pressing ALT when the radial menu is open may display the center button's key tip (a zero) and move the focus to the radial menu. Pressing ALT when the radial menu is collapsed may also display the center button's key tip and move focus to the radial menu launcher. Pressing the center button's key tip may open the radial menu, if it has been collapsed, and display the key tips of all of the top level commands. Pressing ALT+SHIFT+key tip may navigate the user to the sub-menu. Pressing ESC may hide the key tips (and a second ESC may collapse the radial menu). Additionally, key tips may be hidden when pressing any mouse buttons or on pressing any of the navigation keys (arrows, tabs, etc.) or enter/space. Typing a character that does not match any of the key tips or a disabled command may cause an audio and/or visual alert to be issued. After a command has been executed focus may be returned to the document.

For the color picker sub-menu, mouse and keyboard may follow the same behavior as the rest of the radial menu. When the user enters color picker control, the currently selected color may have focus. TAB/DOWN ARROW may navigate clockwise, SHIFT+TAB/UP ARROW may navigate in reverse. RIGHT ARROW may navigate into the sub-color picker and LEFT ARROW may navigate back up to the top level colors or to the previous menu. SPACE or ENTER may select the current focused color.

The font size picker may behave similarly to the rest of the radial menu, with just a few changes due to the unique nature of the control. On entry into the font size control, the current selected font (which may be a size in-between) may have focus. It should be noted that the focus state is not actually shown until the user presses a key that may change focus. TAB may navigate clockwise starting with that item and around the circle selecting the individual font sizes. After navigating to the last top level font size, the next tab may navigate to the dial. After the dial, the next tab may navigate to the back button. Finally, another tab may return focus to the current selected font. SHIFT+TAB may navigate in reverse. The SPACE or ENTER key while on any of the font sizes in the outer ring may apply that font size. LEFT and DOWN ARROW may also navigate through the discrete font sizes in a counter clockwise manner and RIGHT and UP ARROW may navigate through the discrete font sizes in a clockwise manner. When on the slider itself, LEFT ARROW and DOWN ARROW may decrease the slider by one point and RIGHT ARROW and UP ARROW may increase the slider by one point. PAGE UP and PAGE DOWN may increase/decrease the slide by 10 pts (respectively). HOME may move the slider to the minimum font size (e.g., 6 pt) and END may move the slider to the maximum font size (e.g., 130 pt).

Figure 4B:
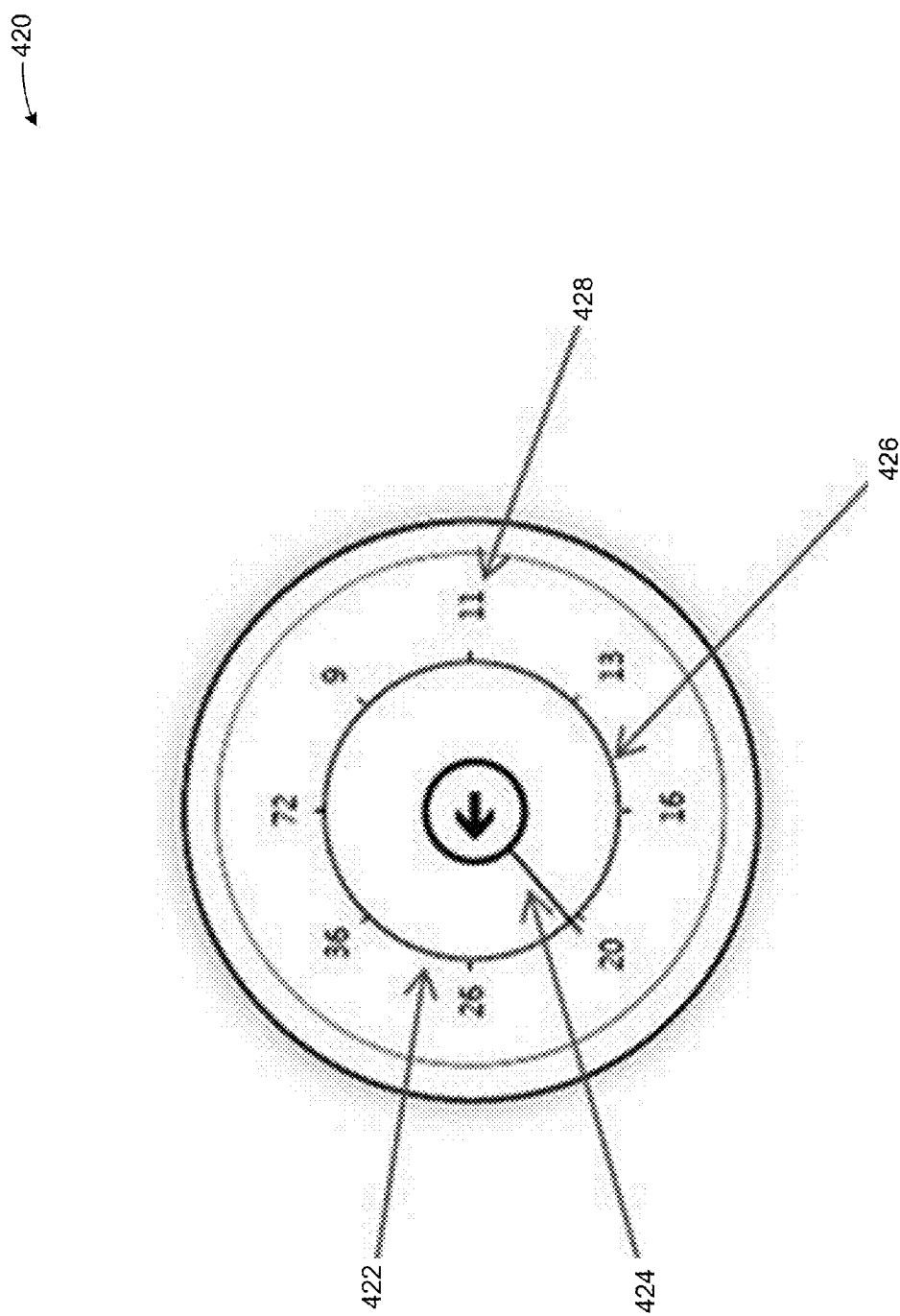
FIG. 4B illustrates some example accessibility based features on a radial context based menu according to some embodiments.

FIG. 4B illustrates some example accessibility based features on a radial context based menu. Despite visually looking like a circle and providing a number of interaction details that are quite different from a traditional menu, to someone who cannot see the screen, a radial context based menu may be mapped directly to something they are used to. For example, the context based menu controls may be mapped to a tree data structure. The tree data structure may be exposed to an accessibility system including a screen reader in order to assign the context based menu controls to traditional menu controls. Traditional menu controls may include desktop application menu controls and similar implementations.

The tree may be used by screen readers that can help a user navigate the elements of their screen through auditory (text-to-speech) cues. This is not the only way, however. The user may also interact with the tree through a set of commands. For example, the user may be able to invoke a command on the tree or toggle a command (e.g., bold).

Thus, the radial menu may behave like a typical context menu (with a combination of a button to open/close the menu as well as a set of menu items) from the perspective of user interface accessibility. The radial menu may also be parented to the application window. At the top level, with the exception of the button to open/close the radial menu, the menu items may be hierarchically structured under the top level item (menu) and appear in the tree in clockwise order starting at the top of the radial menu (at 12 o'clock if the menu appears as a clock). At the sub-level radial menu, the button for returning to the top (or higher) level may be the exception. If the sub-menu has children as well (e.g., the color picker or the table sub-menu), then the hierarchy may continue to the additional level(s). For example, the user interface accessibility tree may look as illustrated in table 1 below for three states of the insert radial menu:

TABLE 1

Tree structure of an example "Insert" menu

| Launcher | Top Level | Tags Submenu |
| --- | --- | --- |
| Menu "Radial Menu: Insert" Button "Open" | Menu "Radial Menu: Insert" Button "Close" MenuItem "Paste" Menu "Submenu: Paste" MenuItem "Link" MenuItem "Picture" Menu "Submenu: Picture" MenuItem "Bullets" Menu "Submenu: Bullets" | Menu "Radial Menu: Insert" Button "Close" MenuItem "Paste" MenuItem "Link" MenuItem "Picture" MenuItem "Bullets" MenuItem "Table" MenuItem "Font Size" MenuItem "Undo" |

TABLE 1-continued

Tree structure of an example "Insert" menu

| Launcher | Top Level | Tags Submenu |
|---|---|---|
| | MenuItem "Table" | MenuItem "Tags" |
| | MenuItem "Font Size" | Menu "Submenu: Tags" |
| |    Menu "Submenu: Font Size" | Button "Back" |
| | MenuItem "Undo" | MenuItem "To Do" |
| |    Menu "Submenu: Undo" | MenuItem "Important" |
| | MenuItem "Tags" | MenuItem "Question" |
| |    Menu "Submenu: Tags" | |

In another example, if an exterior tooltip is visible, then it may appear underneath the relevant control in the tree. For example, if the user has their finger on the Table command on the top level insert radial menu, the tree may look like this:

Menu "Radial Menu: Insert"
Button "Close"
MenuItem "Paste"
MenuItem "Link"
MenuItem "Picture"
MenuItem "Bullets"
MenuItem "Table"
   Tooltip "Insert Table"
MenuItem "Font Size"
MenuItem "Undo"

The font size control may also expose itself as a combination of a list (for the discrete font sizes) as well as a slider control type via the tree. An example slider may include two buttons, one "thumb", and eight or nine list items on a typical radial menu. As shown in diagram 420, one of the buttons may be clockwise from the "thumb" (422) to 72. Pressing the button may increase the font size. The line 424 may be the "thumb on the slider. The other button 426 may be counter-clockwise from the "thumb" to 72 in the other direction. Pressing the button may shrink the font size. Each of the numbers (428) on the dial may also be in a list under the "thumb" such as those shown in diagram 420.

The example accessibility controls, context based menu controls, and context based menus depicted in FIGS. 1 through 4 are provided for illustration purposes only. Embodiments are not limited to the shapes, forms, and content shown in the example diagrams, and may be implemented using other textual, graphical, and similar schemes employing the principles described herein.

Figure 5:
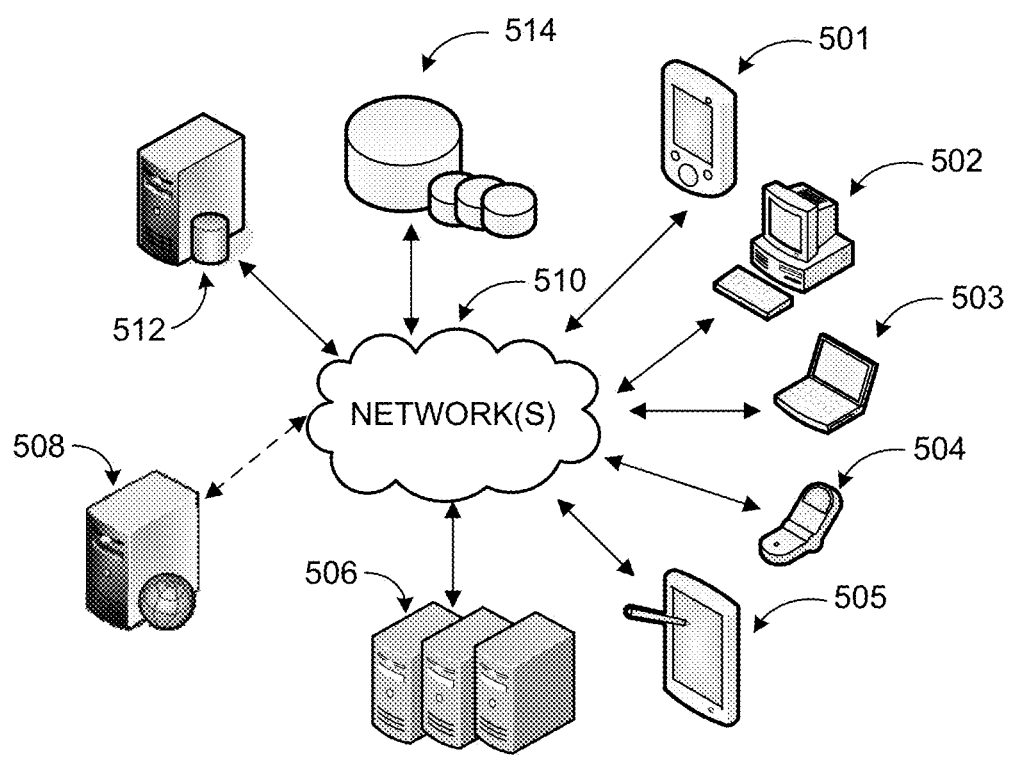
FIG. 5 is a networked environment, where a system according to embodiments may be implemented.

FIG. 5 is a networked environment, where a system according to embodiments may be implemented. In addition to locally installed applications, such as application 622 discussed below, a context based menu for touch and/or gesture enabled devices may be also employed in conjunction with hosted applications and services that may be implemented via software executed over one or more servers 506 or individual server 508. A hosted service or application may be a web-based service or application, a cloud based service or application, and similar ones, and may communicate with client applications on individual computing devices such as a handheld computer 501, a desktop computer 502, a laptop computer 503, a smart phone 504, a tablet computer (or slate), 505 (client devices') through network(s) 510 and control a user interface presented to users. One example of a web-based service may be a productivity suite that provides word processing, spreadsheet, communication, scheduling, presentation, and similar applications to clients through a browser interface on client devices. Such a service may enable users to interact with displayed content through context based menus and a variety of input mechanisms as discussed herein.

As previously discussed, accessibility features on a context based menu may be provided according to superimposed accessibility controls and contrast schemes for the context based menu controls. For example, accessibility controls corresponding to keyboard keys may be superimposed on context based menu controls to provide an input method with tactile feedback. Additionally, a context based menu control may be assigned with a contrasting color compared to a surrounding region to increase the visibility of the control according to embodiments.

Client devices 501-505 are used to access the functionality provided by the hosted service or application. One or more of the servers 506 or server 508 may be used to provide a variety of services as discussed above. Relevant data may be stored in one or more data stores (e.g. data store 514), which may be managed by any one of the servers 506 or by database server 512.

Network(s) 510 may comprise any topology of servers, clients, Internet service providers, and communication media. A system according to embodiments may have a static or dynamic topology. Network(s) 510 may include a secure network such as an enterprise network, an unsecure network such as a wireless open network, or the Internet. Network(s) 510 may also coordinate communication over other networks such as PSTN or cellular networks. Network(s) 510 provides communication between the nodes described herein. By way of example, and not limitation, network(s) 510 may include wireless media such as acoustic, RF, infrared and other wireless media.

Many other configurations of computing devices, applications, data sources, and data distribution systems may be employed to provide accessibility features on a context based menu. Furthermore, the networked environments discussed in FIG. 5 are for illustration purposes only. Embodiments are not limited to the example applications, modules, or processes.

Figure 6:
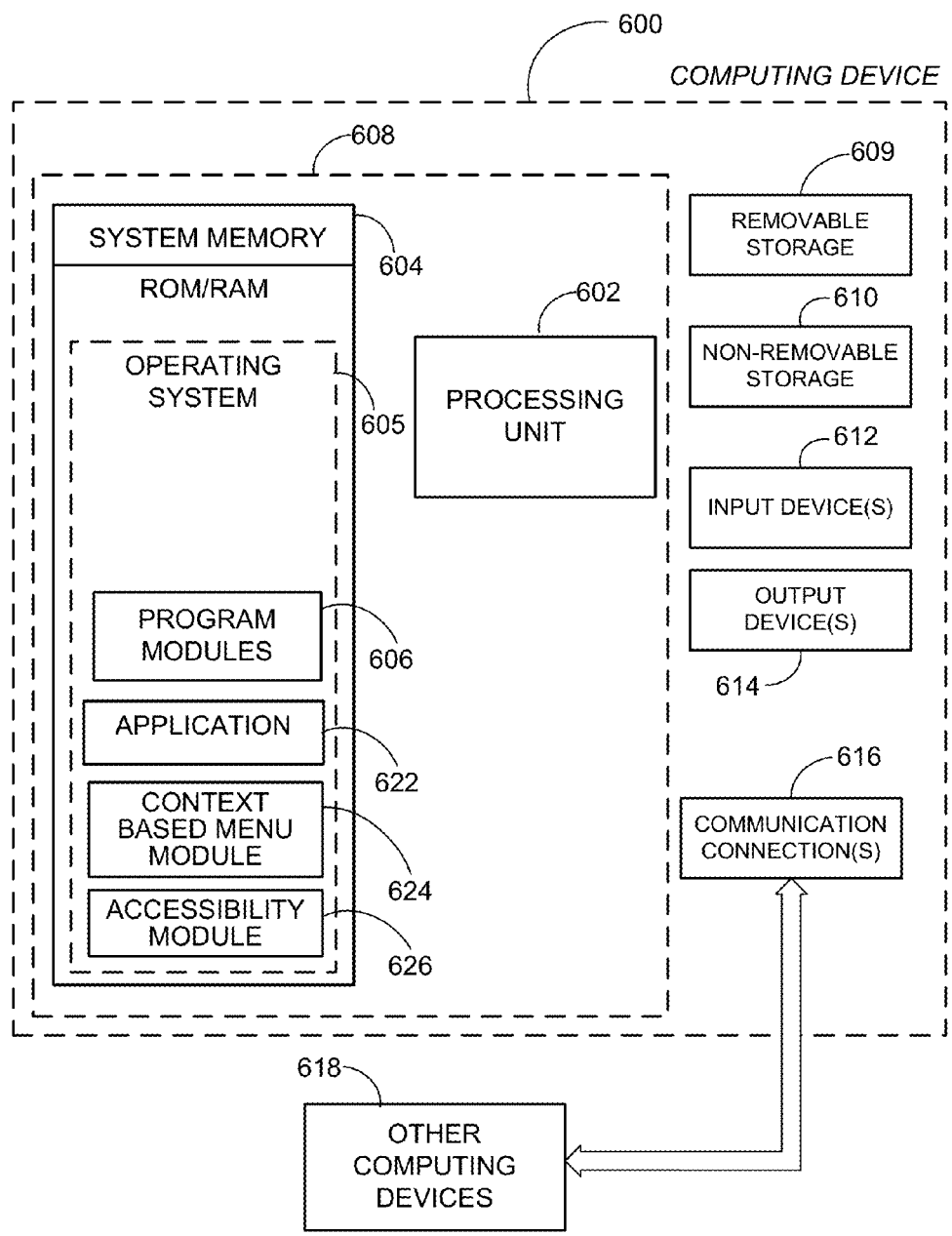
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment according to embodiments is illustrated, such as computing device 600. In a basic configuration, computing device 600 may be any device in stationary, mobile, or other form such as the example devices discussed in conjunction with FIGS. 1A, 1B, and 5, and include one or more processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS®, WINDOWS MOBILE®, or WINDOWS PHONE® operating systems from MICROSOFT CORPORATION of Redmond, Wash. The system memory 604 may also include one or more software applications such as program modules 606, application 622, context based menu module 624, and accessibility module 626.

Context based menu module 624 may operate in conjunction with the operating system 605 or application 622 and provide a context based menu as discussed previously. Context based menu module 624 may also provide controls such as commands, links, and submenu launchers to manage displayed content. Accessibility module 626 may implement contrast schemes, accessibility controls superimposed on the context base menu controls, etc. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, an optical capture device for detecting gestures, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wireless network in a distributed computing environment, a satellite link, a cellular link, and comparable mechanisms. Other devices 618 may include computer device(s) that execute communication applications, other directory or policy servers, and comparable devices. Communication connection(s) 616 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
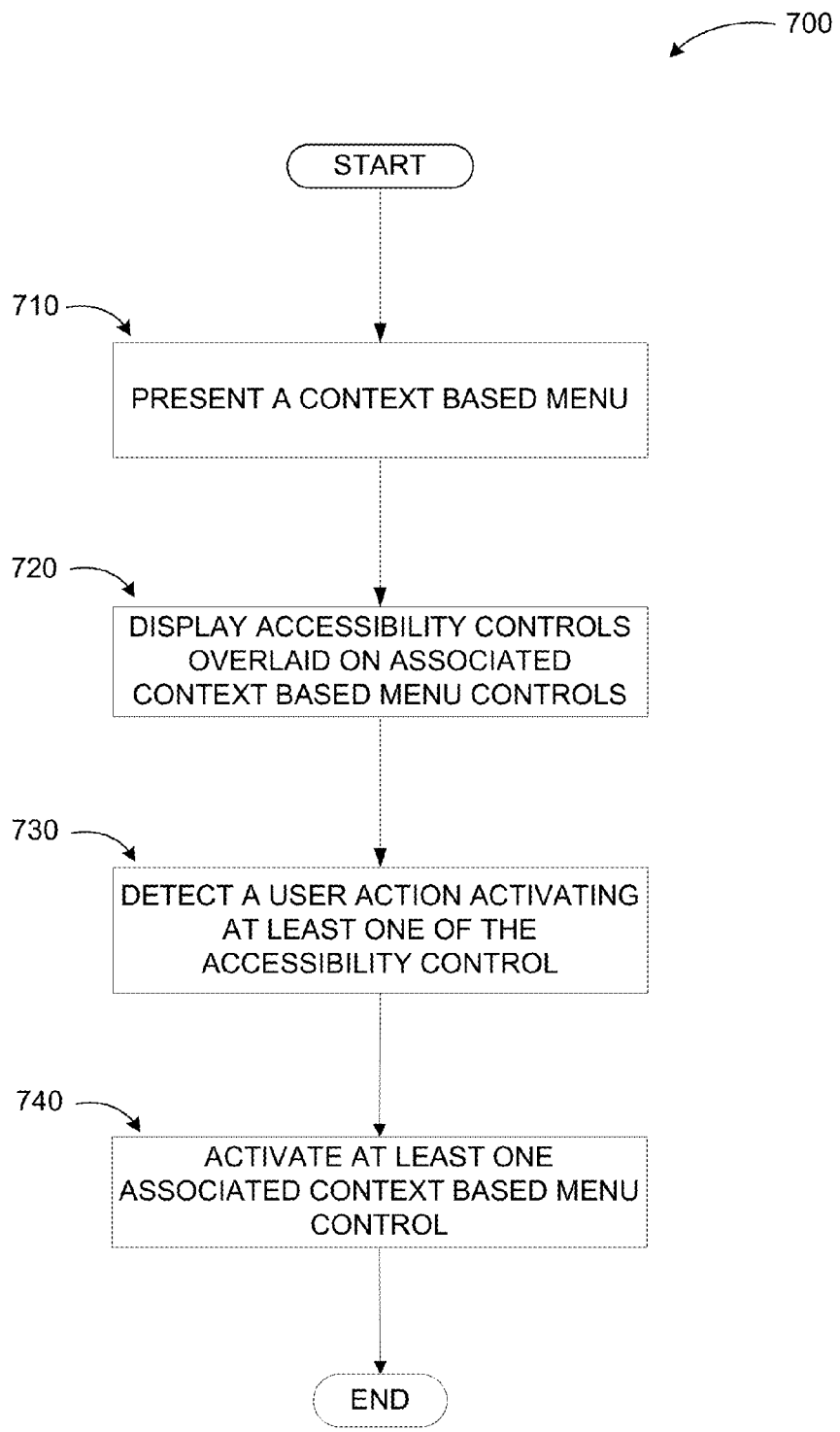
FIG. 7 illustrates a logic flow diagram for a process of providing accessibility features on radial context based menus according to embodiments.

FIG. 7 illustrates a logic flow diagram for a process of providing accessibility features on a radial context based menu according to embodiments. Process 700 may be implemented as part of an application or an operating system of any computing device capable of accepting touch, gesture, keyboard, mouse, pen, voice, visual, or similar inputs.

Process 700 begins with operation 710, where a context based menu may be presented by a user interface. The context based menu may be presented in response to detecting a tap action on a launcher, a tap action on a selection of a portion of displayed content, an insertion point, a tap action on a selection gripper, a swipe action on the launcher slower than a predefined speed, a mouse input, a voice input, a visual input, or a keyboard input. Subsequently, the user interface may display accessibility controls superimposed on associated context based menu controls at operation 720. The accessibility controls may have numbers to associate the accessibility controls with keyboard keys. At operation 730, the user interface may detect a user action activating one or more accessibility controls. Subsequently, the user interface may activate one or more associated context based menu controls at operation 740.

The operations included in process 700 are for illustration purposes. Providing accessibility features on context based menus according to embodiments may be implemented by similar processes with fewer or additional steps, as well as in different order of operations using the principles described herein.

Figure 8:
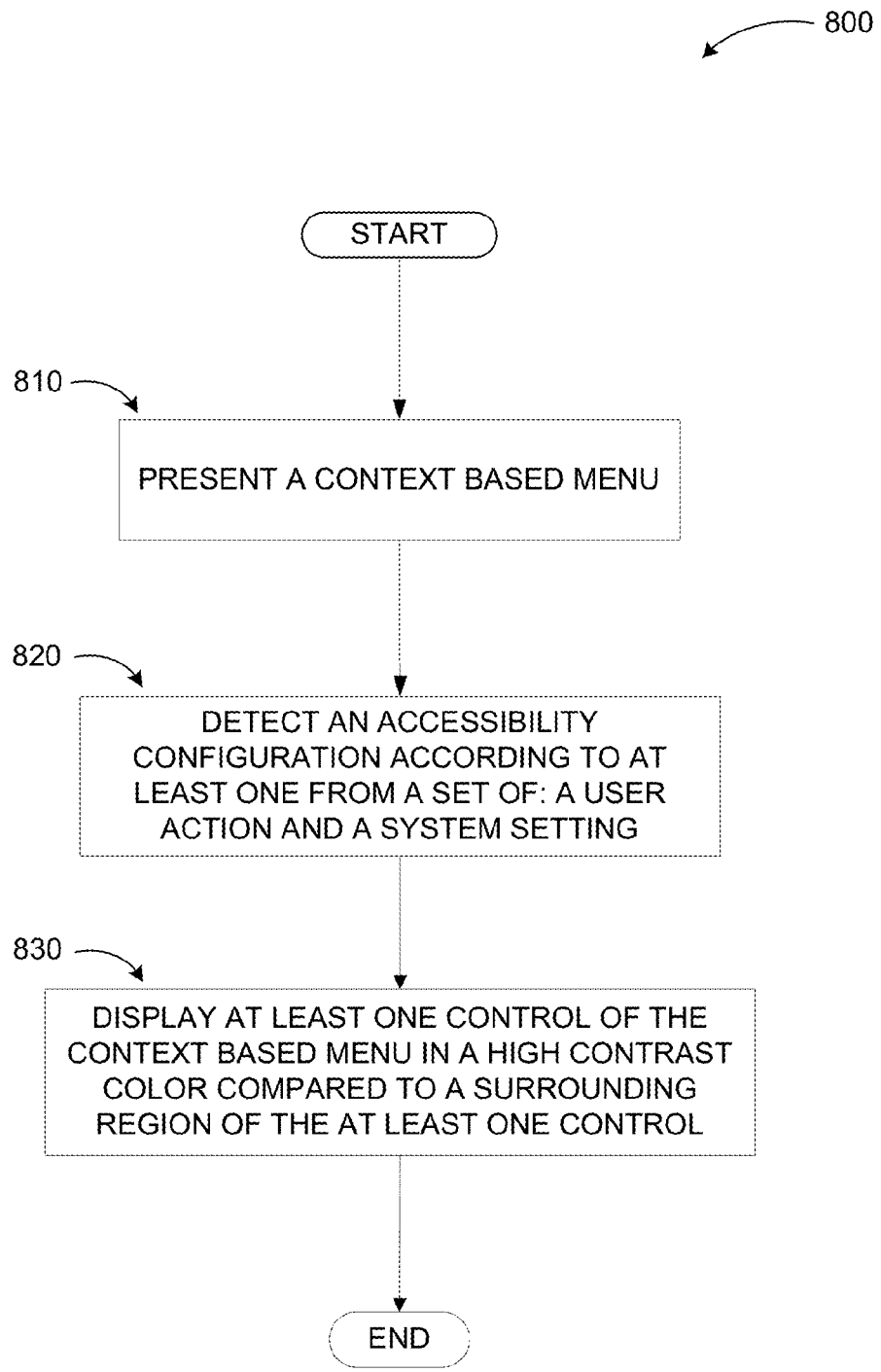
FIG. 8 illustrates a logic flow diagram for another process of providing accessibility features on radial context based menus according to embodiments.

FIG. 8 illustrates a logic flow diagram for another process of providing accessibility features on context based menus according to embodiments. Process 800 may be implemented as part of an application or an operating system of any computing device capable of accepting touch, gesture, keyboard, mouse, pen, voice, visual, or similar inputs.

Process 800 begins with operation 810, where a context based menu may be presented by a user interface. The context based menu may be presented in response to detecting a user action. At operation 820, the user interface may detect an accessibility configuration according to a user action or a device setting. Subsequently, the user interface may display one or more context based menu controls in a high contrast color at operation 830.

The operations included in process 800 are for illustration purposes. Providing accessibility features on context based menus according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part in a computing device for providing accessibility features on radial context based menus, the method comprising:
   in response to detecting one of a: a tap action, a swipe action, a mouse input, a voice input, a visual input, and a keyboard input, presenting a radial context based menu in relation to a displayed content on a user interface;
   displaying one or more accessibility controls superimposed on respective radial context based menu controls;
   in response to a press of a dedicated key, displaying key tips in boxes that overlap the radial context based menu controls, wherein a letter is used in each one of the key tips;
   in response to a conflict of a subset of the key tips of two or more of the radial context based menu controls with a same letter, appending a unique number to an associated letter of the subset of the key tips that have the conflict;
   detecting a user action activating at least one of the accessibility controls;
   activating at least one of associated radial context based menu controls;
   providing a center button near a center of the radial context based menu, the center button enabling an activation of commands, a navigation of the radial context based menu controls, and a collapse of the radial context based menu; and
   providing an unreactive area around the center button to minimize incorrect user action detection between a collapse action, an activation action and additional user actions on the radial context based menu.

2. The method of claim 1, wherein the accessibility controls include at least one of letters and numbers representing keyboard entries assigned to the respective radial context based menu controls.

3. The method of claim 2, further comprising:
   incrementing the numbers on the radial context based menu in one of a clockwise and counterclockwise direction; and
   mapping the numbers directly to a slider control.

4. The method of claim 1, further comprising:
   mapping the respective radial context based menu controls to a tree structure.

5. The method of claim 4, further comprising:
   exposing the tree structure to an accessibility system to enable a user to navigate using one of voice and keyboard access without needing to know that the associated radial context based menu controls are part of the radial context based menu.

6. The method of claim 1, further comprising: mapping an attribute picker to a slider.

7. The method of claim 6, further comprising:
   associating attributes on the attribute picker with discrete items on the slider.

8. The method of claim 7, wherein the attributes include one of: a text style and a graphic style.

9. The method of claim 1, further comprising:
   mapping at least one accessibility control to at least one associated radial context based menu control.

10. The method of claim 9, further comprising:
    exposing the at least one accessibility control to a text-to-speech accessibility system for identification of the at least one associated radial context based menu control.

11. A computing device for providing accessibility features on radial context based menus, the computing device comprising:
    an input device configured to detect at least one of: a swipe action, a tap action, a keyboard action, a mouse action, a voice input, and a visual input;
    a memory;
    a processor coupled to the memory, the processor executing an application and causing a user interface associated with the application to be displayed on a screen, wherein the processor is configured to:
       in response to detecting one of: a tap action, a swipe action, a mouse input, a voice input, a visual input, and a keyboard input, present a radial context based menu in relation to a displayed content on the user interface;
       detect an accessibility configuration according to at least one from a set of: a user action, an operating system setting, and a device setting, wherein a color choice and a contrast scheme are due to a change in a system setting;
       display at least one control of the radial context based menu in a high contrast color compared to a surrounding region of the at least one control in response to detection of an accessibility configuration;
       in response to a press of a dedicated key, display key tips in boxes that overlap the at least one control of the radial context based menu, wherein a letter is used in each one of the key tips;
       in response to a conflict of a subset of the key tips of two or more of the at least one control with a same letter, append a unique number to an associated letter of the subset of the key tips that have the conflict; and
       determine the accessibility configuration according to a user action by one of manually adjusting the contrast scheme and a device setting automatically adjusting the contrast scheme.

12. The computing device of claim 11, wherein the processor is further configured to:
    employ the dedicated key to expose the key tips;
    employ a dedicated character to open the radial context based menu;
    employ a letter following the dedicated character to execute commands; and
    employ another dedicated key and the letter to navigate to submenus.

13. The computing device of claim 11, wherein the processor is further configured to:
    employ one or more of TAB and SHIFT-TAB, ARROW, and PAGE UP and PAGE DOWN keys to navigate through a top level radial context based menu and submenus; and
    employ another dedicated key to close the radial context based menu.

14. The computing device of claim 11, wherein the processor is further configured to:
    in response to detecting a predetermined keyboard input, navigate through the at least one control.

15. The computing device of claim 11, wherein the processor is further configured to:
    in response to detecting a predetermined keyboard input, display at least one key tip associated with the at least one control.

16. The computing device of claim 15, wherein the at least one key tip has a rectangular shape.

17. The computing device of claim 11, wherein the processor is further configured to:
    display at least one label of the at least one control in a high contrast color compared to the at least one control.

18. A method executed at least in part in a computing device for providing accessibility features on radial context based menus, the method comprising:

in response to detecting one of a: a tap action, a swipe action, a mouse input, a voice input, a visual input, and a keyboard input, presenting a radial context based menu in relation to a displayed content on a user interface;

displaying one or more accessibility controls superimposed on respective radial context based menu controls, wherein the context based menu controls are presented at one or more of a fixed location and a dynamically adjustable location;

assigning an alphanumeric character to each one of the accessibility controls;

in response to a press of a dedicated key, displaying key tips in boxes that overlap the context based menu controls, wherein a letter is used in each one of the key tips;

in response to a conflict of a subset of the key tips of two or more of the context based menu controls with a same letter, appending a unique number to an associated letter of the subset of the key tips that have the conflict;

providing voice identification of a shaped context based menu control;

detecting a user action activating an accessibility control;

activating a radial context based menu control associated with an accessibility control;

providing one or more commands to manage hybrid displayed content on the context based menu; and enabling customization of the context based menu, the customization including one or more of: usage based customization, end user customization, and developer customization.

19. The method of claim 18, further comprising:

supporting different sizes of the radial context based menu and menu elements including graphical elements and text through a high pixel density scheme.

20. The method of claim 18, further comprising:

differentiating among different types of the accessibility controls by one of assigning at least one from a set of: an odd number and an even number as the assigned alphanumeric character, and enabling a user to press a key multiple times and navigate between different commands until another key is pressed.

* * * * *